United States Patent [19] | [11] 4,217,972
Jones | [45] Aug. 19, 1980

[54] NON-METALLIC HYDRAULIC LIFT CASING

[75] Inventor: Raymond E. Jones, Lexington, Ky.

[73] Assignee: Dura Corporation, Southfield, Mich.

[21] Appl. No.: 913,468

[22] Filed: Jun. 7, 1978

[51] Int. Cl.² .............................................. B60S 13/00
[52] U.S. Cl. ...................................... 187/8.41; 52/115
[58] Field of Search .................... 187/8.41, 1 R, 2, 98, 187/8.43, 8.65, 8.62; 118/DIG. 11; 254/93 L; 428/36; 52/169.1, 169.13, 115, 745; 405/157, 231-233, 239, 247

[56] References Cited

U.S. PATENT DOCUMENTS

| | | | |
|---|---|---|---|
| 1,804,078 | 5/1931 | Baden | 138/DIG. 6 |
| 2,125,387 | 8/1938 | Mason | 138/DIG. 6 |
| 3,051,141 | 8/1962 | Weaver | 187/8.41 |
| 3,334,706 | 8/1967 | Dayson | 187/8.41 |
| 3,626,702 | 12/1971 | Monahan | 138/105 |
| 3,628,991 | 12/1971 | Thiele et al. | 118/DIG. 11 |

OTHER PUBLICATIONS

"Johns-Manville Fiberglass, Composite Pipe with Ring-Tite Joints", Johns-Manville, Greenwood Plaza, Denver, Colorado, 80217, 3/76.

"Service and Maintenance Manual for Weaver Lifts", Weaver Division, Dura Corp., Paris, Kentucky, 1973.

*Primary Examiner*—Kenneth W. Noland
*Attorney, Agent, or Firm*—Hill, Van Santen, Steadman, Chiara & Simpson

[57] ABSTRACT

A casing for hydraulic lifts and the like of the type buried in the ground. The part of the casing deeply buried in the ground may be subject to corrosion and electrolysis, which is quite common in many soils, and is made from a strong, fiberglas composite material. The part of the casing not subject to corrosion is metallic. Flanges connect the two parts in end-to-end sealed relation with respect to each other and the seals and guides for the plunger are carried in the metallic part of the casing. A non-metallic bulkhead is bonded to the bottom of the fiberglas composite casing and may have a port opening through its bottom wherein the lift is a semi-hydraulic lift as is common with passenger car lifts.

6 Claims, 5 Drawing Figures

NON-METALLIC HYDRAULIC LIFT CASING

BACKGROUND OF THE INVENTION

1. Field of the Invention

This invention relates to vehicle lifts.

2. The Prior Art

Vehicle lifts for lifting automotive vehicles, such as passenger cars, trucks and buses have been in common use for many years. The lifts for passenger cars and light trucks are usually semihydraulic. Where the lift is to lift trucks and buses, the lift is usually full hydraulic. In all such lifts, a casing for oil of a relatively large diameter and long enough to accommodate the lift to lift the vehicle to the required height forms a guide for a vertically movable plunger which carries a superstructure at its upper end for supporting and lifting an automotive vehicle for servicing. The casing is closed at its lower end by a bulkhead buried in the ground.

In many prior art systems, the cylinder base is buried in concrete for corrosion protection. The balance of the casing is buried in the ground, and may be surrounded by sand to reduce the liability of electrolysis and corrosion. In certain types of soils, however, the sand does not stop electrolysis or corrosion of the casing, resulting in leakage of oil from the casing due to corrosion of the casing and making it necessary to excavate around the casing and remove and replace the casing. This may occur in a relatively short time interval compared to the anticipated life of the casing and results in a time-consuming and expensive operation. This occurs even where the metallic casing is wrapped by fiberglas.

Due to the frequency of leaks caused by electrolysis or corrosion, which is entirely dependent upon the soil and is difficult to predict in advance, the manufacturer of lifts seldom extends its guarantee to the casing.

SUMMARY OF THE INVENTION

The present invention is to remedy this deficiency in hydraulic lifts, by using a fiberglass composite casing in the area most subject to electrolysis and corrosion and having high corrosion and electrolysis resistance features and requiring no linings, coatings or cathodic protection. The fiberglass composite casing is preferably made from polyvinyl chloride pipe having a wrapping of fiberglas embedded in epoxy resin, bonded to the polyvinyl chloride pipe by a bonding agent, rendering the surface of the polyvinyl chloride pipe relatively soft as the fiberglas epoxy resin is wound thereon. The polyvinyl chloride core and fiberglas epoxy resin are then cured, resulting in a long life casing resistant to normal waters, dilute acids and alkalis, soap solutions and crude oils with low acromacity.

The preferred polyvinyl chloride casing may have close dimensional control with no thermal shock effect or unexplained break capacity and provides a tight reliable casing in wet conditions as well as dry, cold or hot conditions and has high strength and may be cut with an ordinary saw and beveled where necessary with an ordinary file. The casing further can have cast iron or steel flanges bonded thereto for connecting and sealing the casing with an upper metallic casing carrying the seals and guides for the plunger of the lift, which part of the casing is in a region not usually subject to corrosion or electrolysis. It should be understood that the casing may be buried or exposed to the atmosphere.

An advantage of the present invention is that by a use of a high stress resistant polyvinyl chloride casing havin epoxy resincoated fiberglas bonded to its outer surface, a strong, high-stress casing, capable of taking the pressures of lifting in both semihydraulic and full hydraulic lift systems is attained, having an almost indefinite life.

A further advantage is that an external metallic flange may be permanently bonded to the fiberglas composite casing and form a means for connecting with a metallic casing. Further, the light weight of composite casing is suitable to good handling characteristics during installation.

A still further advantage in the invention is that the upper portion of the casing extending to ground level and not normally subject to corrosion and electrolysis may form a non-deformable support for the seals and guides for the plunger of the lift and form an upward continuation of the polyvinyl chloride epoxy resin-coated fiberglas casing.

A still further advantage of the invention is that the polyvinyl chloride fiberglas epoxy casing is highly effective for hydraulic lifts in which the casing is buried in the ground and forms a permanent casing in contrast to previous casings, and not being subject to electrolysis or corrosion normally need not be replaced for the life of the lift, even in soils in which metallic casings are quickly effected by electrolysis.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

The invention may be more clearly understood with reference to the accompanying drawings wherein.

DESCRIPTION OF THE PREFERRED EMBODIMENT

Figure 1:
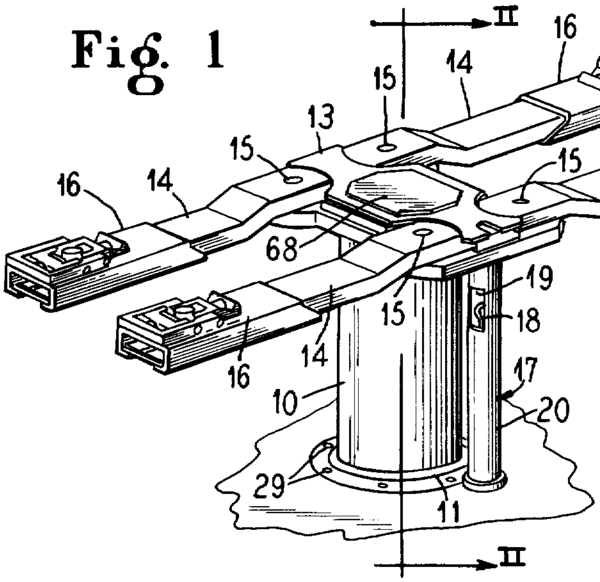
FIG. 1 is a perspective view of the normally visible single plunger fluid-pressure operated lift, which may either be a full hydraulic or semi-hydraulic lift.

In FIG. 1 of the drawings, I have shown a perspective view of a vehicle lift illustrating the lift installed in a service station and the like. Such lifts have a plunger 10 extensible and retractable with respect to a packing gland 11 sealing the plunger to a casing 12 (FIG. 2) buried in the ground.

For purposes of disclosing an exemplary form of the invention, this description refers to a specific type of lift superstructure. However, it should be understood that the invention is for cylinders in general and can be used with any form of lift superstructure.

The plunger 10 forms a support for a lift frame including a superstructure 13 suitably mounted on its top. The superstructure 13 is generally rectangular in plan and includes vehicle support arms 14 vertically pivoted on pivot pins 15, adjacent each corner thereof to enable the arms 14 to be adjusted for various widths of vehicle frames. Each arm has a support pad and chock 16 for the vehicle frame, slidably carried thereon for longitudinal adjustment with respect thereto, to accommodate the lift to be adjusted for vehicle frames of various lengths and widths. It should be understood that the frame need not be an adjustable frame as shown, but may be a roll-on frame of the type found in many older types of lifts. The lift shown, except for the casing, is essentially like that shown in the Weaver Service Manual incorporated herein as a part of this application.

A conventional lift safety device 17 may be of a ratchet type including two telescopic members and serves to stop non-intended lowering of the lift. Said safety device may be released by pulling on a rod 18 (FIG. 1) having a hooked or curved upper end portion affording a ready grip for the fingers and accessible through an opening 19 in an upper telescopic member 20. The safety device may be secured to an upper casing part 21 of the casing 12 in a manner which is no part of the present invention so need not herein be shown or described in detail.

Figure 3:
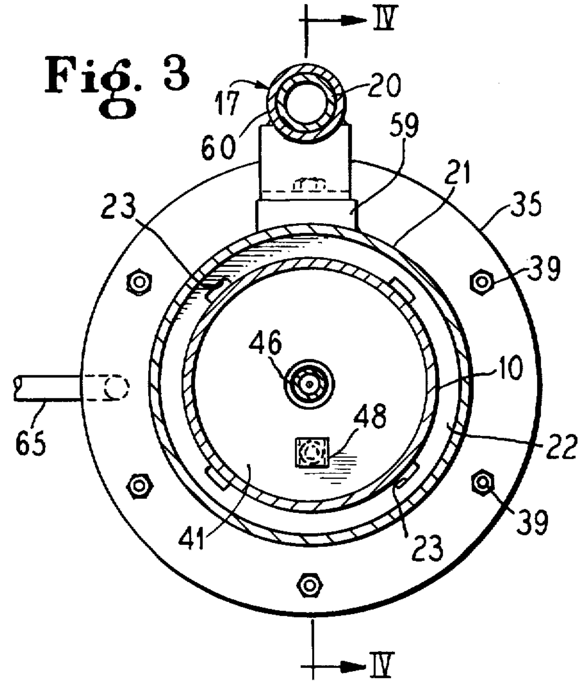
FIG. 3 is a sectional view taken substantially along line III—III of FIG. 2.
Figure 4:
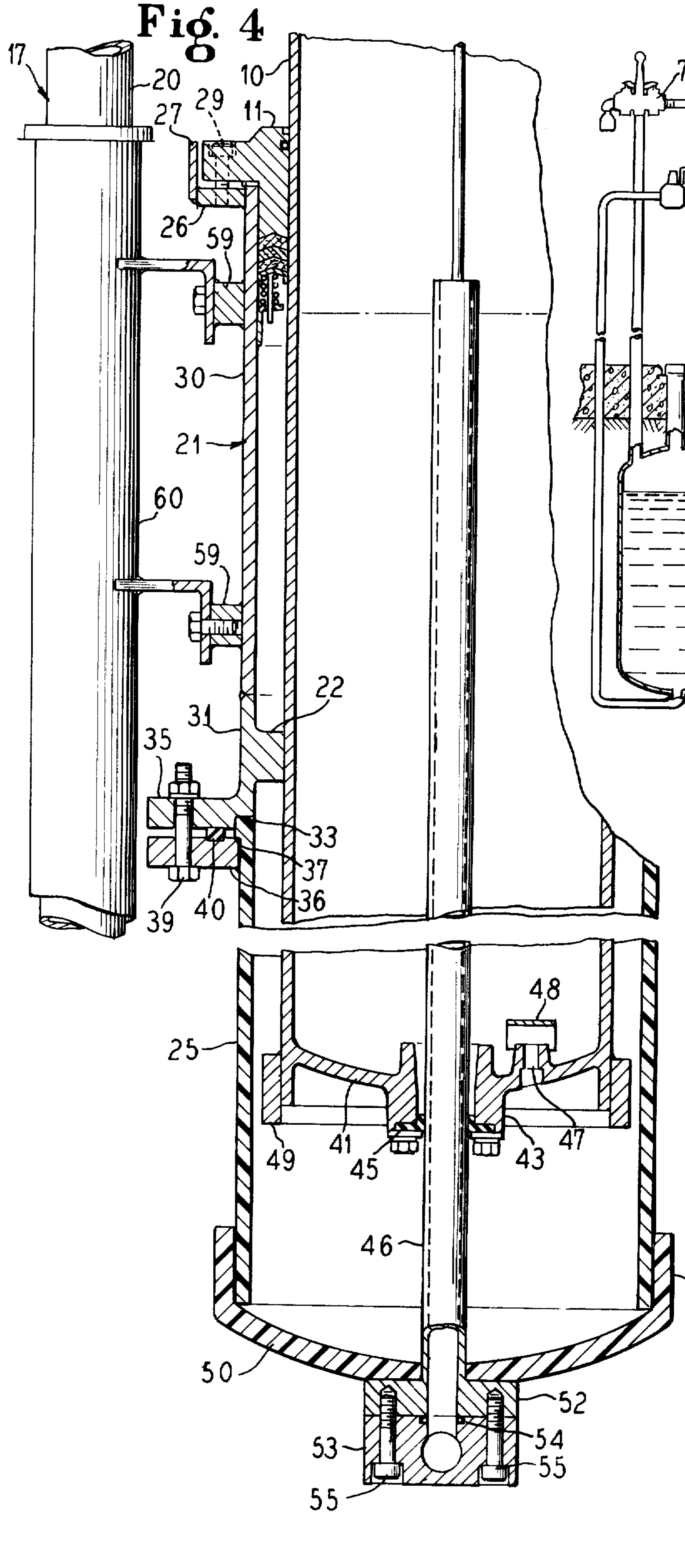
FIG. 4 is an enlarged sectional view illustrating a form of semi-hydraulic lift incorporating the principles of the present invention.

In FIGS. 3 and 4, a semi-hydraulic lift is shown in which the plunger 10 is sealed to the upper casing part 21 and is guided along said upper casing part by an annular guide 22 having slots 23 opening towards the plunger 10 to accommodate the passage of oil thereby. The upper casing part 21 has a flange 35 extending about its lower end portion and forming a means connecting said upper casing part in end-to-end relation with respect to a lower fiberglas composite casing part 25. The lower fiberglas composite casing part 25 may have a polyvinyl chloride cylindrical core wrapped by fiberglas filaments encased in corrosion-resistant epoxy resin, as will hereinafter be more clearly described as this specification proceeds, the general principles of which are shown and described in U.S. Pat. No. 3,628,991, dated Dec. 21, 1971 and incorporated herein as a part hereof.

One form of material which has been satisfactorily used is manufactured by Johns-Manville Corporation under the trademark "Permastran". Other manufacturer's non-metallic tube may be applicable to the subject matter of the present invention.

The upper casing 21 is generally cylindrical, of the same inner diameter as the lower casing part 25. An annular flange 26 extends about the upper end portion of said upper casing part in juxtaposition to the packing gland 11 within a cylindrical lining 27 recessed in the floor of the garage, filling station or place where the lift is installed. The packing gland 11 may be secured to the flange 26 by cap screws 29. A suitable seal may be interposed between the upper end of the upper casing part and the flanged portion of the packing gland 11 to assure a good seal between the packing gland, flange 26 and upper casing part 21.

Figure 2:
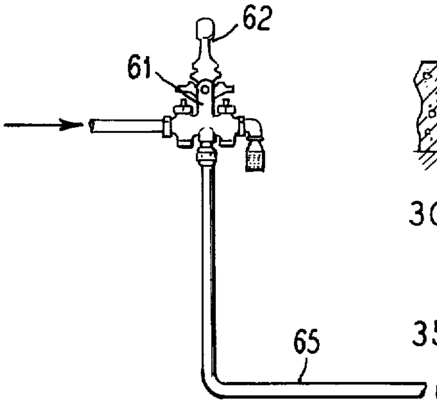
FIG. 2 is a vertical transverse sectional view taken on line II-II through the lift of FIG. 1 and illustrating a semi-hydraulic lift incorporating one principles at the present invention.
Figure 2:
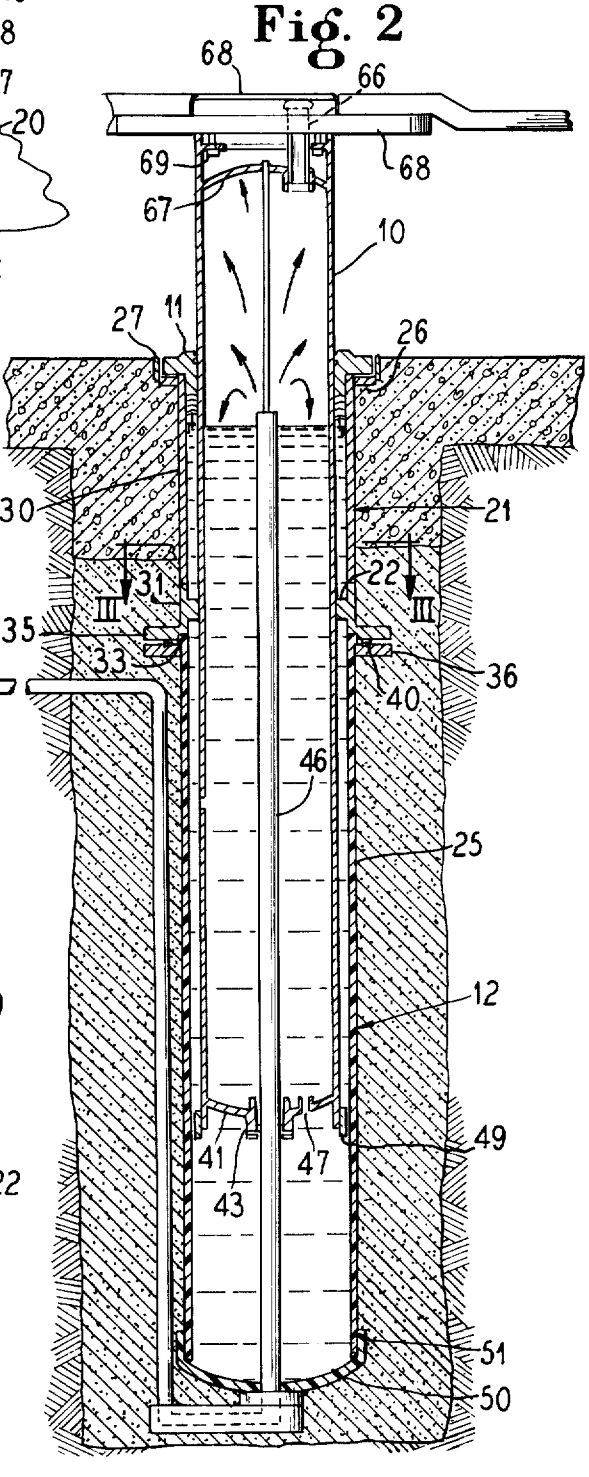

The upper casing part 21 may be made of steel or any other similar suitable material and includes an upper part 30 generally cylindrical in form and a lower part 31, which may be welded or otherwise secured thereto in direct alignment with the upper part. The lower part 31 may be a casing and is shown in FIGS. 3 and 4 as having the guide 22 formed as an integral part thereof and machined to conform to the peripheral wall of the plunger 10 and form a bearing and guide therefor. The lower part 31 has a recessed portion 33 forming a shoulder facing in a downward direction to form an abutment for the lower casing part 25, which may be adhesively bonded thereto. The lower part 31 also has the flange 35 extending radially outwardly therefrom in direct alignment with a flange 36 extending about the outer wall of the fiberglas epoxy resin impregnated polyvinyl chloride lower casing 25 and bonded to said lower casing part by a suitable adhesive. As shown in FIGS. 2 and 4, a shoulder 37 extends about the exterior wall of the lower casing part 25 and forms an abutment surface for the upper end of said fiberglas composite lower casing part 25 and may be bonded thereto by a suitable adhesive. Nuts and bolts 39 (FIGS. 3 and 4) are provided to bolt the flanges 35 and 36 together and positively retain the lower casing part 25 to the upper casing part 21. A seal indicated generally by reference numeral 40 may be interposed between the flanges 35 and 36.

The plunger 10, as shown in FIGS. 2, 3 and 4, is closed by a bottom closure 41 having an enlarged central portion 43 forming a receptacle for a seal 45 extending about an air inlet line 46. The plunger construction just described is conventional. The plunger also has an oil control orifice 47 leading through the closure 41, having a baffle 48 extending over the top thereof (FIG. 4). The plunger also has a maximum travel stop 49 extending about its lower end portion having slots (not shown) formed therein for the passage of oil between the lower casing part and plunger, and having no engagement with the interior wall of the lower casing part 25. A free-sliding bearing cooperating with the annular guide 22 and packing gland 11 guides the plunger for vertical movement along the lower casing part 25.

As shown in FIGS. 2 and 4, the internal air line 46 extends through a lower bulkhead 50 made of a molded fiberglas and having an axial flange 51 extending about the lower end portion of said fiberglas composite lower end portion of said lower casing part 25 and suitably bonded thereto. The bulkhead 50 has an opening leading through its center to receive the internal air line 46, and abutted by a flange 52, shown as being a part of said internal air line and suitably bonded to said molded fiberglas bulkhead 50. An air line fitting 53 abuts the bottom of the flanged portion 52 and is sealed to said flanged portion as by a suitable seal 54, which may be an O-ring. Said air line fitting 53 is shown as secured to said flanged portion 52 as by machine screws 55. The plunger and air supply line 46 are for a semi-hydraulic system as shown in FIGS. 2 and 4.

In the semi-hydraulic system shown, the air supply line extending within the casing part 25 terminates above the oil level in the casing. Said internal air line 46 is maintained in position by an internal air line guide, holding the air line in position during extensible and retractable movement of said plunger.

The upper casing part 21 also has a pair of vertically spaced lugs 59 welded or otherwise secured to the exterior wall thereof and forming a means for bolting on a guide tube 60 extending vertically therealong and forming a part of the safety release 17 (FIG. 4), and no part of the present invention so not herein shown or described further.

The supply of air to the internal air line, as shown in FIG. 2, is under the control of a double-acting air valve 61 of a conventional form operated by a hand lever 62 and admitting air under pressure to the air supply line to act against oil in plunger 10 and effect raising of the plunger and lift, and moved in an opposite direction to release air from said internal air line. The valve 61 may supply air under pressure to the fitting 53 and internal air line 46 may be through an air line 65 buried in the ground.

Oil is admitted to the interior of the plunger 10 and casing parts 21 and 25 through an oil fill opening and capped tube 66 leading through an upper bulkhead 67 for the plunger 10 and shown as spaced beneath a flange 69, affording a means for bolting the plunger 10 to the base frame of the superstructure 13 in a conventional manner. A plate 68 may extend over the capped tube 66 and be removed for access thereto. The admission of air under pressure thus acts against the bulkhead 67 and hydraulic fluid such as oil in the plunger 10 and casing parts 21 and 25 to effect the raising of said plunger 10 relative to said casing parts.

Figure 5:
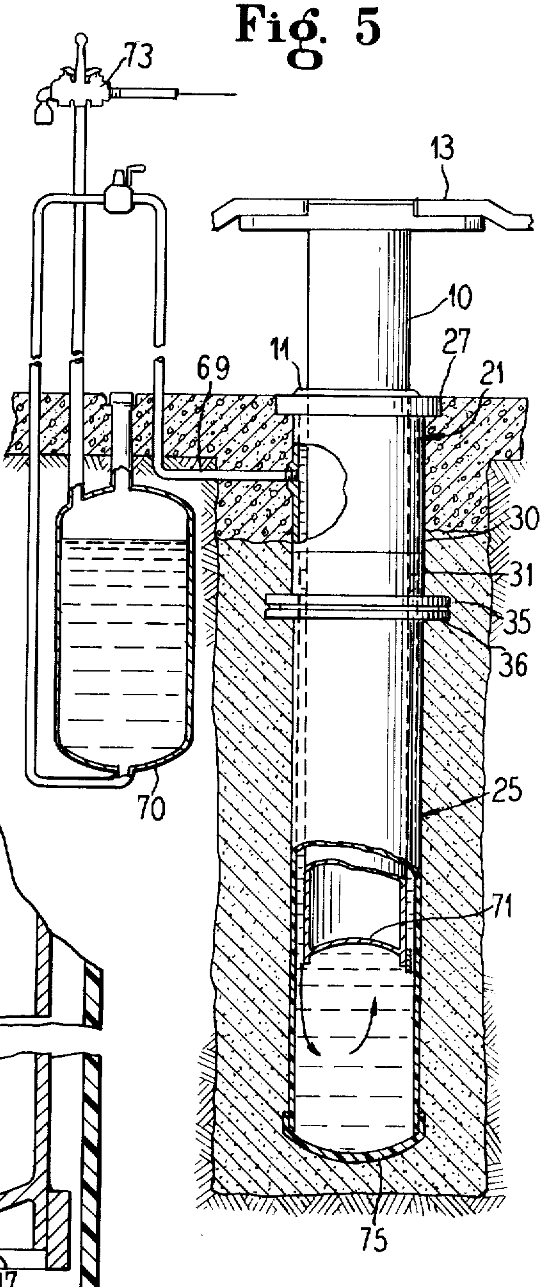
FIG. 5 is a view illustrating a form of full hydraulic lift incorporating the principles of the present invention.

In the full hydraulic system shown in FIG. 5, an oil supply line 69 leads from an accumulator or reservoir 70 which may be buried in the ground and is shown as being pressurized by air, although a conventional storage tank accumulator and pump may be used instead. The oil supply line leads through the wall of the upper casing part 21 to supply oil under pressure to the space between the upper and lower casing parts and act on a bulkhead 71 closing the bottom of the plunger 10. The supply of air under pressure to the tank 70, to pressurize the oil therein, may be under the control of a double-acting valve 73 to supply or release pressure from the oil in the tank 70. The valve 73, reservoir or accumulator 70 for the full hydraulic system are conventional, so need not herein be described further. In the full hydraulic system, the lower casing part 25 is closed by a bulkhead 75 preferably made from molded fiberglas and similar to the bulkhead 50, except that it does not have the opening for an air supply line.

It should be clear from the foregoing brief description of both semi-hydraulic and full hydraulic lifts that said lifts employ many of the same features and that similar upper and lower casings may be used for both systems, the primary casing difference being that in the full hydraulic system, the bulkhead 75 closes the lower casing part, while in the semi-hydraulic system, an air supply line leads through the bulkhead 50 closing the lower casing part.

Since the present invention eliminates the risks of corrosion, there is no need to bury the lower end of the casing in concrete so all of the lower casing is embedded in sand. The upper casing may be embedded in concrete as shown in FIGS. 2 and 5, if so desired although the lower end portion of said upper casing part is embedded in sand.

Applicant desires further to stress that the metallic upper casing part taking the lateral stresses for the lift contains the guides for the plunger, although the guides 49 extending about the lower end portion of the plunger slidably engage the lower casing part. While the lower casing part is herein described as made from a composite plastic pipe formed from polyvinyl chloride wrapped with epoxy resin impregnated fiberglas known by the trade name "Permastran", it may be made from other plastic materials having the required strength and durability and requiring no cathodic protection, and having the strength and flexibility to withstand external forces that are likely to create breaks in the casing part.

I claim as my invention:

1. In a hydraulic lift of the type comprising:

a cylindrical casing and plunger assembly, a superstructure on top of said plunger, fluid pressure means for admitting fluid under pressure to said cylindrical casing and plunger assembly for raising and lowering a plunger relative to said cylindrical casing, and control means for said fluid pressure means, wherein the improvement comprises:

a multi-part casing forming said cylindrical casing in which said plunger is reciprocated, said multi-part casing having an upper non-deformable metallic casing part forming a guide for the plunger and having bearing means taking the lateral stresses on the plunger, and a lower non-metallic casing part comprising a relatively inert fiberglass composite having a polyvinyl chloride core wrapped by fiberglass filaments encased in corrosion-resistant epoxy resin, and coupling means joining said upper and lower parts so that said lower part forms a downward continuation of said metallic casing part and extends into the ground into a region subject to electrolysis and corrosion, and means for locking said parts in aligned relation with respect to each other.

2. The lift of claim 1, including a flange bonded to the upper end of said non-metallic casing part, said bearing means comprising an annular guide extending inwardly of said metallic casing part and having guiding engagement with said plunger, and a flange extending radially outwardly of the lower end of said metallic casing part in registry with said flange bonded to said non-metallic casing part, the lower end of said metallic casing part having a recess formed therein to receive the upper end of said fiberglass metallic composite casing part, and said flange at the lower end of said metallic casing part being in direct alignment with said flange extending radially of said nonmetallic casing part and forming a means for bolting said casing parts in aligned relation with respect to each other, and an annular seal disposed between said flanges.

3. The lift of claim 2, wherein the non-deformable metallic casing part is in two parts and includes an upper part formed of steel and extending to floor level and a cast lower part forming a downward continuation of said upper part and having said flange and guide formed as integral parts thereof.

4. The lift of claim 1 in which the multi-part casing includes spaced lugs extending from the exterior wall of said metallic casing part and forming a mounting means for a vertically extending safety release, and the portion of said metallic casing part beneath a lower-most lug of said lugs being cast and having said guide for said plunger cast integrally therewith and said position of said metallic casing part has a downwardly opening recess formed therein for receiving said non-metallic casing part in alignment therewith.

5. The lift of claim 1 wherein the non-metallic casing part is a fiberglass composite casing and wherein a molded fiberglass bulkhead extends about the lower end portion of said fiberglass composite casing part and is suitably bonded thereto.

6. The lift of claim 5, wherein the fiberglass composite casing is made from polyvinyl chloride pipe having a wrapping of fiberglass embedded in epoxy resin and bonded to the polyvinyl chloride pipe by a bonding agent.

* * * * *